UNITED STATES PATENT OFFICE 2,316,605

PREPARATION OF ORGANIC ESTERS

Donald J. Loder, William F. Gresham, and Donald B. Killian, Wilmington, Del., assignors to E. I. du Pont de Nemours & Company, Wilmington, Del., a corporation of Delaware No Drawing. Application March 29, 1940, Serial No. 326,662

2 Claims. (Cl. 260—484)

This invention relates to a process for the preparation of substituted hydroxy organic acids and more particularly to the preparation of alkyl (alkoxy alkoxy) organic acid esters by the interaction of acetals with hydroxy organic acids and their esters.

The products of the present invention may be designated by the empirical formula, $$C_nH_{2n}(OCRROR')COOR''$$

for the unsymmetrical compound, and $$C_nH_{2n}(OC_nH_{2n}COOR'')_2$$

for the symmetrical compound, wherein R is a hydrogen or alkyl group, R' is an alkyl, aryl, aralkyl, or a carboalkoxy methoxy group and R'' is an alkyl, aryl, or aralkyl group, and $n$ is an integer greater than 1. Specific examples of these are methyl (1-methoxyethoxy) acetate,

methyl (1-ethoxyethoxy) acetate,

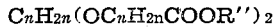

ethyl (1-propoxyethoxy) acetate,

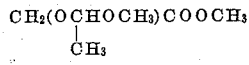

methyl 2-(1-methoxyethoxy) propionate,

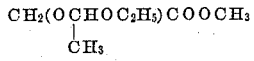

1,1-di (carboxymethoxy) ethane,

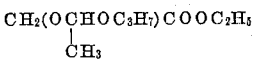

1,1-di (carbomethoxymethoxy) ethane,

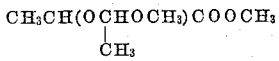

and similarly substituted hydroxy carboxylic acid esters

An object of the present invention is to provide a process for the preparation of the above designated and similar alkyl (1-alkoxy substituted alkoxy) carboxylic acid esters as well as the above and similar symmetrical compounds. Another object of the invention is to provide a process for the preparation of such compounds by the interaction of hydroxy carboxylic acids or their esters with acetals. A further object of the invention is to provide a process wherein hydroxy carboxylic acids such as hydroxy acetic acid or dehydrated hydroxy acetic acid or its esters are reacted with an acetal in the presence of a suitable catalyst. Other objects and advantages of the invention will hereinafter appear.

The esters of alpha-oxy substituted alkoxy carboxylic acids may be prepared in accord with the process of the invention by interacting an acetal with a hydroxy carboxylic acid (which may or may not be dehydrated) such as hydroxy acetic acid, hydroxy propionic acid, and esters thereof. The reaction may be conducted by preparing a mixture containing, for example, partially dehydrated hydroxy acetic acid, e. g. a glycolide or other anhydride, an acetal, and a suitable acidic catalyst, such as a strong mineral acid, (for example, sulfuric acid, phosphoric acid, or the like, hydrated forms of boron fluoride may also be used), and refluxing the resulting mixture to bring about the reaction. The product is then recovered after neutralizing the catalyst with a base, such as sodium or potassium hydroxide, carbonate, or the like, the alcohol being, if desired, continuously removed from the reaction mixture by distillation either as such or as an azeotrope with the acetal or some other alcohol withdrawing agent and subsequently drying and distilling the resulting products.

Various acetals may be thus reacted in accord with the present invention. (The word "acetals" is used in its common and restricted sense in this specification and claims i. e. it does not include the formals.) The following are given by way of example, acetaldehyde dimethyl acetal, acetaldehyde diethyl acetal, acetaldehyde methyl ethyl acetal, propanal dimethyl acetal, propanal diethyl acetal, butyral dimethyl acetal, butyral diethyl acetal, and higher symmetrical and unsymmetrical acetals. Cyclic acetals may likewise be included such, for example, as the ethylene, propylene, butylene, and higher alkylene acetals. Ketals may be used, in lieu of or in conjunction with the acetals, examples of which are 2,2-dimethoxypropane, $(CH_3)_2C(OCH_3)_2$; 2,2 dimethoxybutane $(C_2H_5)(CH_3)C(OCH_3)_2$; 2,2 diethoxypropane, $(CH_3)_2C(OC_2H_5)_2$; 2-methoxy-2-ethoxypropane, $(CH_3)_2C(OCH_3)(OC_2H_5)$; cyclohexanone ketals and the like.

The reaction proceeds satisfactorily at atmospheric pressure, although autogenous pressures and pressures in excess of atmospheric, e. g. from 10 to 700 atmospheres, may be employed if desired. When strong mineral acids, such as sulfuric acid, phosphoric acid, hydrochloric acid, hydrobromic acid, and the like, are used as a catalyst for the reaction, they may be present in amounts ranging between 0.05% and 2% of the total reactants, while if a hydrated boron fluoride is used, it may be present in somewhat larger amounts. The reaction generally may be conducted at temperatures of from 25 to 180° C. or higher, although the preferred temperature range is between 40 and 100° C.

As has been indicated, hydroxy carboxylic acids or their dehydration products may be employed. The partially dehydrated hydroxy acetic acid may be prepared, for example, by heating the acid and driving off water until there remains a mixture of glycolide and hydroxy acetic acid containing in the order of from 20 to 90% hydroxy acetic acid. It will be found that there are advantages resulting from the use of the partially dehydrated acid in place of the undehydrated acid as a reactant, such, for example, as markedly lower hydrolysis of the acetal, shorter reaction time, and more complete reaction to the product desired. Glycolide-free hydroxy acetic acid, however, may be used. The alkyl hydroxy acetates, such as methyl, ethyl, n- and isopropyl, n- and isobutyl hydroxy acetates can be used if desired in place of hydroxy acetic acid or glycolide and hydroxy acetic acid. In like manner, lactic acid and the esters of lactic acid as well as lactid are suitable, as are also the higher hydroxy carboxylic acids, such, for example, as hydroxy butyric acid, hydroxy isobutyric acid, hydroxy valeric acid and the like.

The proportion of acetal to acid or ester used will be determined by the type of product it is desired to produce. If the half reaction or unsymmetrical product is to be prepared, the stoichiometrical requirements are equimolecular proportions; these requirements for the symmetrical compounds are two moles of acid or ester per mole of the acetal. Practically, however, it is preferred to use from 2 to 8 moles of the acetal per mole of the acid or ester if the unsymmetrical compounds is to be prepared, and from 2 to 8 moles of the acid or ester per mole of the acetal if the symmetrical compound is to be prepared.

A more detailed practice of the invention is illustrated by the following examples in which parts given are by weight unless otherwise stated. There are, of course, many forms of the invention other than these specific embodiments.

*Example 1.—Reaction of isobutyl hydroxyacetate with diethyl acetal*

Six moles of isobutyl hydroxyacetate, 3 moles of diethyl acetal, $CH_3CH(OC_2H_5)_2$, containing 0.2% concentrated sulfuric acid, were refluxed under a pressure of from 50 to 100 mm. for from 3 to 5 hours. The sulfuric acid catalyst was then neutralized with sodium methoxide (although other suitable base such as sodium or potassium hydroxide or carbonate may be used), the low boiling materials present removed by distillation, and the residual product fractionally distilled. 1,1-di(carboisobutoxymethoxy) ethane $$(C_4H_9OOCCH_2O)_2CHCH_3$$

was recovered in a conversion of 20.2%, based on the acetal employed. It was a water-white oil, having a boiling point of approximately 83° C. at 2 mm. pressure, which was insoluble in water and soluble in hydrocarbons, the lower aliphatic alcohols, and ketones.

*Example 2.—Reaction of methyl hydroxyacetate with 1,1-dimethoxyisobutane*

1.67 moles of 1,1-dimethoxyisobutane $$(CH_3O)_2CHCH(CH_3)_2$$

3.1 moles of methyl hydroxyacetate, and approximately 0.5% concentrated sulfuric acid was refluxed under a pressure of from 50 to 100 mm. until the evolution of methanol ceased, the methanol being removed as formed. The sulfuric acid was then neutralized with sodium methoxide, the lower boiling materials distilled off, and the residue fractionally distilled, whereupon there was recovered in a conversion of 22%, based on the acetal employed, 1,1-di(carbomethoxymethoxy)-2-methyl propane, $(CH_3OOCCH_2O)_2CHCH(CH_3)_2$, a white colorless oil having a boiling point between approximately 112 and 115° C. at 5 to 6 mm. It was substantially water insoluble and soluble in hydrocarbons, the lower aliphatic alcohols, and ketones.

*Example 3.—Reaction of ethyl hydroxyacetate with the diethyl ketal of cyclohexanone*

1.54 moles of the diethyl ketal of cyclohexanone

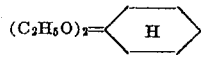

3.08 moles of ethyl hydroxyacetate and approximately 0.4% concentrated sulfuric acid was refluxed under a pressure of from 50 to 100 mm. until no more methanol distilled over. The sulfuric acid catalyst present was neutralized with sodium methoxide and the resulting mixture distilled to remove the low boiling constituents and subsequently fractionated. 1,1-di(carboethoxymethoxy) cyclohexane

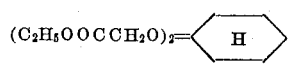

was obtained in a conversion of approximately 24.4% calculated on the amount of ketal employed. This compound was a water-white oil having a boiling point between approximately 131° and 137° C. at 2 mm. pressure, which was substantially insoluble in water and soluble in hydrocarbons, lower aliphatic alcohols, and ketones.

The products of this invention are useful as solvents and plasticizers for cellulose acetate, propionate, nitrate, aceto-propionate, ethyl cellulose, etc. in lacquer and film-flowing compositions, and in the preparation of similar compositions in which the natural and synthetic resins are used, such as, dammar, copal, urea-formaldehyde, phenol-formaldehyde, glyptal resins and the like. They may be reacted with polyhydric alcohols for the preparation of resins and with ammonia to form amines which may be subsequently polymerized. Moreover, they may be used as softeners for regenerated cellulose and as intermediates for the preparation of organic compounds.

In the specification and claims appended and especially the latter hydroxy carboxylic acids will be understood to include the partially or completely dehydrated acid such as glycolide; and acetal (which has the empirical formula

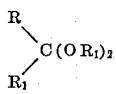

in which R is hydrogen or an alkyl group and $R_1$ an alkyl group) will include the designated acetals and the ketals.

We claim:

1. A process for the preparation of 1,1-di(carbomethoxymethoxy)-2-methyl propane, which comprises reacting methyl hydroxyacetate with 1,1-dimethoxyisobutane in the presence of an acidic catalyst.

2. 1,1 - di(carbomethoxymethoxy) - 2 - methyl propane, $(CH_3OOCCH_2O)_2CHCH(CH_3)_2$.

DONALD J. LODER.
WILLIAM F. GRESHAM.
DONALD B. KILLIAN.